(12) United States Patent
Zhang et al.

(10) Patent No.: US 11,174,345 B2
(45) Date of Patent: Nov. 16, 2021

(54) DEGRADABLE POLYESTER FIBER AND PREPARING METHOD THEREOF

(71) Applicant: JIANGSU HENGLI CHEMICAL FIBRE CO., LTD., Wujiang (CN)

(72) Inventors: Yuanhua Zhang, Wujiang (CN); Zhujun Ding, Wujiang (CN); Lili Wang, Wujiang (CN)

(73) Assignee: JIANGSU HENGLI CHEMICAL FIBRE CO., LTD., Wujiang (CN)

( * ) Notice: Subject to any disclaimer, the term of this patent is extended or adjusted under 35 U.S.C. 154(b) by 0 days.

(21) Appl. No.: 17/277,306

(22) PCT Filed: Oct. 29, 2019

(86) PCT No.: PCT/CN2019/113873
§ 371 (c)(1),
(2) Date: Mar. 18, 2021

(87) PCT Pub. No.: WO2020/134498
PCT Pub. Date: Jul. 2, 2020

(65) Prior Publication Data
US 2021/0284792 A1    Sep. 16, 2021

(30) Foreign Application Priority Data

Dec. 27, 2018 (CN) .......................... 201811615787.7

(51) Int. Cl.
| | | |
|---|---|---|
| *D01F 1/10* | (2006.01) | |
| *C08G 63/682* | (2006.01) | |
| *D01F 6/92* | (2006.01) | |
| *C08G 63/86* | (2006.01) | |

(52) U.S. Cl.
CPC ....... *C08G 63/6826* (2013.01); *C08G 63/866* (2013.01); *D01F 1/10* (2013.01); *D01F 6/92* (2013.01)

(58) Field of Classification Search
CPC ..... C08G 63/6826; C08G 63/866; D01F 6/92; D01F 1/10; D01F 6/84; C08K 3/22; C08K 3/36
USPC ....................................................... 523/222
See application file for complete search history.

(56) References Cited

U.S. PATENT DOCUMENTS

| | | | |
|---|---|---|---|
| 10,968,538 | B1* | 4/2021 | Yin .......................... D01F 6/92 |
| 2012/0322714 | A1 | 12/2012 | Haberecht et al. |
| 2021/0017673 | A1* | 1/2021 | Wang ................... C08G 63/695 |

FOREIGN PATENT DOCUMENTS

| | | |
|---|---|---|
| CN | 1119836 A | 4/1996 |
| CN | 1247181 A | 3/2000 |
| CN | 106245149 A | 12/2016 |
| CN | 106283251 A | 1/2017 |
| CN | 106367835 A | 2/2017 |
| CN | 106381557 A | 2/2017 |
| CN | 106801265 A | 6/2017 |
| CN | 108071009 A | 5/2018 |
| CN | 108130624 A | 6/2018 |
| CN | 108385186 A | 8/2018 |
| CN | 108385194 A | 8/2018 |
| CN | 109722740 A | 5/2019 |

OTHER PUBLICATIONS

English Translation of CN 106367835 A. (Year: 2017).*

* cited by examiner

*Primary Examiner* — Hannah J Pak
(74) *Attorney, Agent, or Firm* — Bayramoglu Law Offices LLC

(57) ABSTRACT

A type of degradable polyester fiber and preparing method thereof are disclosed. The preparing method is to melt spinning a modified polyester with the fully drawn yarn (FDY) technique, and the modified polyester is composed of the terephthalic acid segments, the ethylene glycol segments, the 2,5,6,6-tetramethyl-2,5-heptanediol segments and the fluorinated dicarboxylic acid segments, wherein the fluorinated dicarboxylic acid is one selected from 2,2-difluoro-1,3-malonic acid, 2,2-difluoro-1,4-succinic acid, 2,2-difluoro-1,5-glutaric acid and 2,2,3,3-tetrafluoro-1,4-succinic acid. Moreover, the modified polyester is dispersed with the doped $ZrO_2$ powder. The obtain fiber has an intrinsic viscosity drop of 23-28% when stored at 25° C. and R.H. 65% for 60 months. The method herein is of low cost and easy technologies, whereas the obtained fiber has a rapid natural degradation rate and a wide application prospect.

17 Claims, No Drawings

DEGRADABLE POLYESTER FIBER AND PREPARING METHOD THEREOF

CROSS REFERENCE TO THE RELATED APPLICATIONS

This application is the national phase entry of International Application No. PCT/CN2019/113873, filed on Oct. 29, 2019, which is based upon and claims priority to Chinese Patent Application No. 201811615787.7, filed on Dec. 27, 2018, the entire contents of which are incorporated herein by reference.

TECHNICAL FIELD

The present invention belongs to the field of polyester fiber, and more particularly, relates to one type of degradable polyester fiber and preparing method thereof.

BACKGROUND

Chemical fiber, based on the development of organic synthetic chemistry and polymer chemistry in the 1920s, has become one of the most important roles of the industry just in a few decades with the output and applications far exceed those of natural fiber. Among them, polyester, nylon and acrylic fiber are the three major fibers in chemical fiber. Among these three fibers, because of the fastest development speed, the most extensive application and the highest output of polyester fiber, it is one of the most important textile materials.

Polyester fiber is the largest variety of synthetic fiber, and is made of polyethylene terephthalate (PET) through the melt spinning and the after-treatment processes, whereas PET is synthesized from terephalic acid (PTA, or dimethyl terephalate, DMT) and ethylene glycol (EG) through the esterification (or transesterification) and the following polycondensation. As a semi crystalline polymer with good thermoplastic properties, PET has been widely used in various fields such as clothing, packaging, biology and manufacturing. However, with the rapid development of PET industry, although PET will not directly cause harm to the environment, the difficulties in the PET waste treatment can indirectly increase environmental pressure due to its huge amount and strong resistance to atmospheric and microbial degradation. Actually, the number of waste clothing is increasing year by year with the increasing living standard, just in china nearly 30 million tons of waste clothing are produced every year. At present, landfill, incineration and recovery are the main methods to treat PET waste, from the environmental protection point of view, landfill and incineration are easy but dirty. Conversely, the degradation recovery has been believed as an efficient and scientific treatment for PET waste. However, the tight structure, the high crystallinity and the long natural degradation time of PET bring much restriction to the degradation recovery, and the highest proportion of recycling for common PET fabric in U.S. is just about 13% whereas in China that is even low as 10%.

In practical application, chemical degradation methods are mostly used for PET, including hydrolysis and alcoholysis, as well as ammonolysis, amination and pyrolysis, however, they are still far from solving the recycling of a large number of waste clothing because of the problems such as slow degradation rate and poor degradation effect. As matter of fact, the natural degradation of clothing polyester fiber (PET filament) has become an urgent problem in view of the needs of environmental protection, resource conservation and sustainable development.

Therefore, it is of great significance to develop a kind of degradable polyester fiber with high degradation speed and high degradation efficiency.

SUMMARY

The primary object of the present invention is to provide one kind of degradable polyester fiber with high degradation speed and high degradation efficiency as well as the preparing method thereof, so as to overcome the inadequacies in the clothing polyester fiber (PET filament) made from the existing technology.

To this end, the key technical points of the invention are as follows.

The preparing method of degradable polyester fiber is to melt spinning a modified polyester with a fully drawn yarn (FDY) technique;

wherein said modified polyester is the product of the esterification and the successive polycondensation reactions of evenly mixed terephthalic acid, ethylene glycol, 2,5,6,6-tetramethyl-2,5-heptanediol, a fluorinated dicarboxylic acid and the doped $ZrO_2$ powder;

wherein said 2,5,6,6-tetramethyl-2,5-heptanediol has a molecular formula as

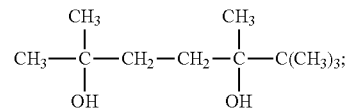

wherein said fluorinated dicarboxylic acids could be 2,2-difluoro-1,3-malonic acid, 2,2-difluoro-1,4-succinic acid, 2,2-difluoro-1,5-glutaric acid or 2,2,3,3-tetrafluoro-1,4-succinic acid;

wherein said doped $ZrO_2$ is obtained through a process of evenly mixing $M^{x+}$ solution and $Zr^{4+}$ solution at first, then dripping in the precipitant until the pH=9-10, and finally calcining the precipitate; wherein $M^{x+}$ is more than one ion selected from $Mg^{2+}$, $Li^+$ and $Zn^{2+}$.

Herein the polyester is modified by 2,5,6,6-tetramethyl-2,5-heptanediol, in which the tert-butyl groups will change the segment movement mode, the inter-segment force and the inter-segment distance of the polyester main chains so as to enlarge the void free volume. Prior to the slit free volume, the void free volume is favorable to the penetration of air or water into the polyester, hence can improve its natural degradation performance to a certain extent.

Herein the natural degradation performance is further improved by introducing a fluorinated dicarboxylic acid and the doped $ZrO_2$ powder.

Herein incorporated fluorinated dicarboxylic acid possesses the characteristic of fluorine atom being bonded to α-C. During the hydrolysis process of polyester, the electron cloud density in the C—O bond is reduced by the electron-withdrawing effect of α-C bonded fluorine atom hence the stability of the tetrahedral anion intermediate formed by ester carbonyl together with nucleophilic attacker will also decrease, which is conducive to the nucleophilic addition reaction. Moreover, the steric hindrance of fluorinated dicarboxylic acid is less than that of terephthalic acid, which further promotes the nucleophilic addition reaction. Therefore, the degradation based on the nucleophilic addition of polyester will be significantly accelerated.

Herein the degradation rate of polyester is accelerated through improving the oxygen reduction catalysis efficiency of $ZrO_2$ doped with the metal oxide (more than one of magnesium oxide, lithium oxide and zinc oxide) via solution blending, coprecipitation and calcination. $ZrO_2$, as an oxygen reduction catalyst substrate with high ionic conductivity, can form the stable cubic phase if doped with low valence metal ions ($Mg^{2+}$, $Li^+$ and $Zn^{2+}$). At the same time, to a certain extent, the closer the radius of doping ion is to the radius of doped ion, the more conducive to the formation of oxygen vacancies and the more conducive to the conduction of oxygen ion. Hence in the present invention the metal ions ($Mg^{2+}$, $Li^+$ and $Zn^{2+}$) with the same radius of $Zr^{4+}$ ion (0.103 nm) are selected as the doping ions to improve the conduction rate of oxygen ions and the degree of oxygen reduction reaction during the $Zr^{4+}$ catalyzed polyester degradation process.

Herein incorporated 2,5,6,6-tetramethyl-2,5-heptanediol, the fluorinated dicarboxylic acid and the doped $ZrO_2$ powder could show a synergistic effect on the degradation of polyester. Specifically, first the nucleophilic addition involved in the polyester degradation could be promoted by reducing the electron cloud density on the C—O bonds in polyester with the existence of the fluorinated dicarboxylic acid, then the oxygen reduction could be accelerated by the high oxygen ion conduction generated by the doped $ZrO_2$ powder, and the oxygen concentration would be raised because of the effective oxygen and water penetration via the void free volume which has been enlarged by the comonomer 2,5,6,6-tetramethyl-2,5-heptanediol.

The following preferred technology program is presented to give a detailed description for this invention.

In the preparing method of the degradable polyester fiber hereinabove, wherein said 2,5,6,6-tetramethyl-2,5-heptanediol is synthesized by means of:

(1) mixing KOH, 3-methyl-3-hydroxybutyne, 3,3-dimethyl-2-butanone and isopropyl ether in the molar ratio of 1-1.2:1:1.2-1.3:2.0-3.0, then carrying out the reaction in an ice bath for 2-4 hr, finally obtaining octynyldiol through a series of processes of cooling crystallization, centrifugation, washing, refining and drying;

(2) mixing octynyldiol, alcohol and Pd catalyst in the weight ratio of 2-3:10:0.01-0.03, then carrying out the reaction accompanied with a continuous hydrogen input at 40-50° C. for 50-60 min, finally obtaining 2,5,6,6-tetramethyl-2,5-heptanediol through a series of processes of separation and purification.

In the preparing method of the degradable polyester fiber hereinabove, for the preparation of doped $ZrO_2$, wherein said $M^{x+}$ solution is an aqueous one with a concentration of 1-2 wt % and the anion is $NO_3^-$; wherein said $Zr^{4+}$ solution is a product of dissolving 20-25 wt % of $ZrO_2$ in nitric acid; wherein said precipitant is ammonia water with a concentration of 2 mol/L; wherein said solution blending before the coprecipitation is to make a mixture containing 5-8:100 (molar ratio) of $M^{x+}$ respecting to $Zr^{4+}$, and the ratio should be understood as not a limit but an adjustable one within a proper range (if the ion molar ratio is too high the performance of $ZrO_2$ will be affected whereas if the ion molar ratio is too small the oxygen ion conduction rate cannot be improved obviously.);

wherein said calcining is preceded by a washing and drying process for the precipitate, and the drying is carried out at a temperature of 105-110° C. for 2-3 hr; wherein said calcining includes steps of a 400° C. heating for 2-3 hr, a 700° C. heating for 1-2 hr, a cooling in air and a grinding to obtain particles with an average size less than 0.5 micron.

In the preparing method of the degradable polyester fiber hereinabove, wherein said modified polyester is prepared by means of:

(1) Esterification concocting terephthalic acid, ethylene glycol, 2,5,6,6-tetramethyl-2,5-heptanediol and the fluorinated dicarboxylic acid into a slurry, then adding in the doped $ZrO_2$, the catalyst, the matting agent and the stabilizer and carrying out the esterification in a nitrogen atmosphere with a pressure of normal value-0.3 MPa at 250-260° C., finally ending the reaction when the water distillation reaching more than 90% of the theoretical value;

(2) Polycondensation for the esterification products, smoothly reducing the pressure to less than 500 Pa (absolute value) within 30-50 min and carrying out reaction at 250-260° C. for 30-50 min, successively, further reducing the pressure to less than 100 Pa (absolute value) and continuing the reaction at 270-282° C. for 50-90 min.

In the preparing method of degradable polyester fiber hereinabove, wherein the molar ration of terephthalic acid and ethylene glycol is 1:1.2-2.0, and being relative to the amount of terephthalic acid, the total addition of 2,5,6,6-tetramethyl-2,5-heptanediol and fluorinated dicarboxylic acid (in a molar ratio of 2-3:3-4) is 3-5 mol %, whereas the addition of the doped $ZrO_2$, the catalyst, the matting agent and the stabilizer are 0.03-0.05 wt %, 0.04-0.07 wt %, 0.03-0.05 wt %, 2-3 wt % and 0.01-0.05 wt %, respectively. The additive amounts of 2,5,6,6-tetramethyl-2,5-heptanediol, the doped $ZrO_2$ and the fluorinated dicarboxylic acid have been optimized to improve the degradation performance of the polyester fiber without causing the loss in mechanical strength and crystallinity, which could also be adjusted according to the actual application but the adjustment range should not be too large, otherwise, under the upper overflow the mechanical and crystallization performance will be effect owing to the destruction of polyester chain regularity whereas under the lower overflow the modification efficiencies cannot be fully achieved.

In the preparing method of degradable polyester fiber mentioned above, wherein said catalyst is one of antimony trioxide, ethylene glycol antimony or antimony acetate, wherein said matting agent is titanium dioxide, and wherein said stabilizer is triphenyl phosphate, trimethyl phosphate or trimethyl phosphite;

wherein said modified polyester has a molecular weight of 25000-30000 Da and a molecular weight distribution index of 1.8-2.2;

wherein said FDY technique includes steps of metering, spinneret extruding, cooling, oiling, stretching, heat setting and winding;

wherein said FDY process involves the technological parameters of spinning temperature 285-295° C., cooling temperature 19-22° C., interlacing pressure 0.20-0.30 MPa, godet roller 1 speed 2300-2700 m/min, godet roller 1 temperature 80-90° C., godet roller 2 speed 3800-4200 m/min, godet roller 2 temperature 115-130° C., winding speed 3730-4120 m/min, which should be understood as not a limit but a feasible scheme.

In the present invention the degradable polyester fiber obtained through the preparing method hereinabove is also provided, which is a type of modified polyester FDY;

wherein said modified polyester has a molecular chain structure composed of terephthalic acid segments, ethylene glycol segments, 2,5,6,6-tetramethyl-2,5-heptanediol segments and fluorinated dicarboxylic acid segments;

wherein said modified polyester is also dispersed with the doped $ZrO_2$ powder which is obtained through a process of evenly mixing $M^{x+}$ solution and $Zr^{4+}$ solution at first, then dripping in the precipitant until the pH=9-10, and finally calcining the precipitate; wherein $M^{x+}$ is more than one ion selected from $Mg^{2+}$, $Li^+$ and $Zn^{2+}$.

Prepared through the preferred technology program mentioned above, herein obtained degradable polyester fiber has the following performance indices: monofilament fineness 1.0-2.0 dtex, breaking strength ≥3.0 cN/dtex, elongation at break 32.0±4.0%, interlacing degree 13±2/m, linear density deviation rate ≤1.0%, breaking strength CV value ≤5.0%, breaking elongation CV value ≤9.0%, and boiling water shrinkage rate 6.5±0.5%, which are close to those of the common polyester fiber without 2,5,6,6-tetramethyl-2,5-heptanediol, the fluorinated dicarboxylic acid and the doped $ZrO_2$ from the existed techniques because of the low additive amounts of those modifiers.

herein obtained degradable polyester fiber has an intrinsic viscosity drop of 23-28% after a storage at 25° C. and R.H. 65% for 60 months, which is much higher than 5% obtained under the same conditions for the contrast sample without the additions of 2,5,6,6-tetramethyl-2,5-heptanediol, the fluorinated dicarboxylic acid and the doped $ZrO_2$.

The mechanism of this invention could be described as follows.

As a matter of fact, the accumulation of macromolecular chains in polymer are not so compact that there still exist some gaps between those chains, which are known as the free volumes. Enough free volumes are necessary for small molecules to diffuse and penetrate into the polymer, and within certain range, the larger the free volume, the better the diffusivity and the higher the permeability. The free volume can be classified by void one and slit one, and the void free volume is more efficient for the penetration of small molecules.

The size and class of free volume are dependent on the polymer structures such as steric hindrance, side group size and side group structure, etc. When a certain site in polymer main chain is substituted by a side group, the mobility of the main chain will be changed, as a result, the interaction force and the distance between polymer chains, as well as the cohesive energy and the free volume of polymer, will vary accordingly. In fact, the polarity, the size and length of side substitution group can draw influences on the rigid, the molecular interaction, and even the free volume of polymer. Therefore, different side groups will lead to different penetration performance.

The backbone conformation of the straight-chain diols, such as ethylene glycol and 1,4-butanediol, is like a zigzag almost lying in a plane. When a H atom of one certain methylene group in the main chain is substituted by a methyl group, the side C atom will locate at one vertex of the tetrahedron formed by the sp3 hybridization of the connected main chain C atom. Meanwhile, the side C atom itself is of sp3 hybridization to form another tetrahedron, therefore, the methyl substitution group cannot lie in the zigzag plane. Furthermore, if the H atoms in methyl group are further substituted by other methyl groups to from a tert-butyl group more such tetrahedrons will be formed. Hence it is easy to understand the tert-butyl substituted polyester will possess a complicated molecular conformation different far from the zigzag to ensure much more void free volumes. However, if a long side chain instead of methyl group is bonded to the polyester backbone, the increase of free volume will be mainly owing to the slit one which is not so sufficient to promote the penetration. Moreover, the long alkyl side chain is easy to cause entanglement because of its flexibility, which is also make against the increase of free volume.

In the present invention, the natural degradation performance of polyester yarn is improved by introducing 2,5,6,6-tetramethyl-2,5-heptanediol as a comonomer into the polyester, whose has a molecular formula as follows:

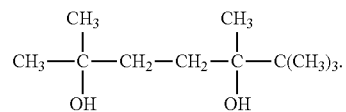

The existence of 2,5,6,6-tetramethyl-2,5-heptanediol in PET will change the mobility of the main chain so as to change the interaction force and the distance between PET molecular chains, finally enlarging the void free volumes of PET. Compared with short substitution chains such as methyl or ethyl group, the tert-butyl group has a larger space occupation which can gain larger free volume in the molecular aggregate. Whereas compared with long substitution chains, the tert-butyl group will mainly provide the void free volume with larger size than that of the slit free volume which generated mainly by the long side chains, furthermore, the tert-butyl group, with a higher rigidity prior to the long alkyl chains, will seldom cause the entanglement of polymer chains. The enlargement of void free volume favorable to the penetration of water or air molecules into the fiber will increase the reactant concentrations involved in the nucleophilic addition in the hydrolysis of PET, so as to improve the degradation to a certain extent.

The hydrolysis of polyester in alkaline medium is a nucleophilic addition-elimination process. During the ester hydrolysis, the nucleophilic addition reaction will occur firstly, in which OH⁻ attacks C atom in ester carbonyl RCOOR' to form a tetrahedral anion intermediate. From this tetrahedral anion, carboxylic acid RCOOH will be formed by eliminating OR' through the broken of ester bond, meanwhile alcohol HOR' can also be obtained from the combination of OR' with $H^+$. However, normally the tetrahedral intermediate has a cramped structure with high steric hindrance, which is detrimental to the nucleophilic addition reaction, hence the ester hydrolysis usually carries on with a rather slow rate.

In the present invention, the polyester hydrolysis is significantly accelerated by importing special structural fluorinated dicarboxylic acid, concretely, dicarboxylic acid containing a α-C bonded with fluorine atoms. During the hydrolysis process of polyester, the electron cloud density in the C—O bond is reduced by the electron-withdrawing effect of fluorine atom boned to the α-C hence the stability of the tetrahedral anion intermediate will decrease, which is conducive to the nucleophilic addition reaction. Moreover, the steric hindrance of fluorinated dicarboxylic acid is less than that of terephthalic acid, which further promotes the nucleophilic addition reaction, thus significantly increasing the degradation rate. However, the degradation rate of polyester will not be improved significantly if the imported diol contains fluorine atom bonded to β-C because the electron-withdrawing effect generated by fluorine atom can only pass to adjacent carbon atom but hardly to C—O bond in ester group, hence the attacking of OH⁻ upon carbonyl in nucleophilic addition reaction will not be affected so much.

Moreover, normally the polyester fiber in service will be exposed to the air for a long time. When the polyester contains a certain amount of oxygen reduction catalyst, the oxygen in air can penetration into the polyester through the free volume and will be absorbed and enriched in the surface of oxygen reduction catalyst, then the absorbed oxygen could be partially reduced to peroxide which can combine with ester groups to form RCOOOR'. When the latter further combines with a proton and the O—O bond breaks off, one RCOOH will form through this broken of ester bond, at the same time, OR' can connect with H⁺ to produce alcohol HOR'. Through the mechanism mentioned above, the degradation of polyester can be accelerated.

In the present invention the degradation rate of polyester is accelerated through improving the oxygen reduction catalysis efficiency of $ZrO_2$ doped with the metal oxide (more than one of magnesium oxide, lithium oxide and zinc oxide) via solution blending, coprecipitation and calcination. $ZrO_2$, as an oxygen reduction catalyst substrate with high ionic conductivity, can form the stable cubic phase if doped with low valence metal ions ($Mg^{2+}$, $Li^+$ and $Zn^{2+}$). At the same time, to a certain extent, the closer the radius of doping ion is to the radius of doped ion, the more conducive to the formation of oxygen vacancies and the more conducive to the conduction of oxygen ion. Hence in the present invention the metal ions ($Mg^{2+}$, $Li^+$ and $Zn^{2+}$) with the same radius of $Zr^{4+}$ ion (0.103 nm) are selected as the doping ions to improve the conduction rate of oxygen ions and the degree of oxygen reduction reaction during the $Zr^{4+}$ catalyzed polyester degradation process. The effect of doping modification on $ZrO_2$ is clarified as follows.

On one hand, the doping mode herein will destroy the crystal plane structure of $ZrO_2$ so as to enlarge its specific surface area, hence the oxygen adsorption capacity per unit mass of $Bi_2O_3$ is increased.

On the other hand, the doping mode herein will change the adsorption mode and oxygen reduction mechanism of $ZrO_2$. Concretely, $O_2$ molecules tend to be adsorbed in the end type through a physical adsorption of low strength or a weak chemical adsorption into the surface of original monoclinic $ZrO_2$ and to be reduced to peroxides, in addition, the adsorption will also be affected by the steric hindrance of Zr atom in the surface. Whereas in the doped $ZrO_2$, the adsorption changes to the side type which will not be affect by the steric hindrance, and the proportion of chemical adsorption is improved, moreover, the breaking off of O—O bond is also promoted, i.e., the oxygen reduction efficiency is increased. Therefore, the degradation of polyester rate will be accelerated by importing doped $ZrO_2$. Nevertheless, combining $ZrO_2$ with the metal oxide (such as more than one of magnesium oxide, lithium oxide and zinc oxide) just by physical blending cannot lead to the effects mentioned above, because the crystal plane structure, the adsorption mode and the oxygen reduction mechanism of $ZrO_2$ will not change in that way. The degradation will start in the surface of fiber made of common polyester, whereas in this invention, a comprehensive degradation with high efficiency could be realized owing to the polyester dispersed with oxygen reduction agent which can maintain oxygen internally for a long time.

As a matter of fact, the degradation will just start in the surface of fiber made of common polyester, whereas in this invention, a comprehensive degradation with high efficiency could be realized owing to the polyester dispersed with oxygen reduction agent which can maintain oxygen internally for a long time.

In the present invention the incorporated 2,5,6,6-tetramethyl-2,5-heptanediol, the fluorinated dicarboxylic acid and the doped $ZrO_2$ powder could also show a synergistic effect on the degradation of polyester. Specifically, first the nucleophilic addition involved in the polyester degradation could be promoted by reducing the electron cloud density on the C—O bonds in polyester with the existence of the fluorinated dicarboxylic acid, then the oxygen reduction could be accelerated by the high oxygen ion conduction generated by the doped $ZrO_2$ powder, and the oxygen concentration would be raised because of the effective oxygen and water penetration via the void free volume which has been enlarged by the comonomer 2,5,6,6-tetramethyl-2,5-heptanediol.

In conclusion, the present invention provides (1) a method for preparing the degradable polyester fiber in which the natural degradation performance of fiber is improved to a certain extent by introducing 2,5,6,6-tetramethyl-2,5-heptanediol which can enlarge the free volume of polyester;

(2) a method for preparing the degradable polyester fiber in which the natural degradation performance of fiber is significantly improved by introducing the fluorinated dicarboxylic acid and the doped $ZrO_2$ powder;

(3) a method for preparing the degradable polyester fiber which is of easy technologies and low cost;

(4) a type of degradable polyester fiber with rapid natural degradation rate, good mechanical properties and wide application prospect.

DETAILED DESCRIPTION OF THE EMBODIMENTS

Based on above mentioned method, the following embodiments are carried out for further demonstration in the present invention. It is to be understood that these embodiments are only intended to illustrate the invention and are not intended to limit the scope of the invention. In addition, it should be understood that after reading the contents described in the present invention, those technical personnel in this field can make various changes or modifications to the invention, and these equivalent forms also fall within the scope of the claims attached to the application.

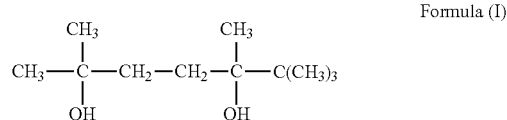

Formula (I)

Example 1

A method for preparing the degradable polyester fiber, comprising the steps:

(1) Preparation of Modified Polyester (1.1) Synthesizing 2,5,6,6-tetramethyl-2,5-heptanediol (a) mixing KOH, 3-methyl-3-hydroxybutyne, 3,3-dimethyl-2-butanone and isopropyl ether in the molar ratio of 1:1:1.2:2.0, then carrying out the reaction in an ice bath for 2 hr, finally obtaining octynlydiol through a series of processes of cooling crystallization, centrifugation, washing, refining and drying;

(b) mixing octynyldiol, alcohol and Pd catalyst in the weight ratio of 2:10:0.01, then carrying out the reaction accompanied with a continuous hydrogen input at 40° C. for 50 min, finally obtaining 2,5,6,6-tetramethyl-2,5-heptanediol through a series of processes of separation and purification; wherein obtained target compound possessing a molecular structure just as shown in Formula (I);

(1.2) Doping Modification of $ZrO_2$ (a) evenly mixing the 1.5 wt % of $Mg(NO_3)_2$ aqueous solution and the 22 wt % of $ZrO_2$ nitric acid solution in a molar ratio 6:100 of $Mg^{2+}$ and $Zr^{4+}$;

(b) depositing the mixed solution by dripping in 2 mol/L of ammonia water till pH=9, then washing and drying (at 108° C. for 2.5 hr) the precipitate;

(c) after the treatments including a heating at 400° C. for 2.5 hr, a heating at 700° C. for 1.5 hr and a cooling in air, finally grinding the precipitate to obtain the doped $ZrO_2$ powder with an average particle size of 0.4 micron;

(1.3) Esterification concocting terephthalic acid, ethylene glycol, 2,5,6,6-tetramethyl-2,5-heptanediol and 2,2-difluoro-1,3-malonic acid into a slurry, then adding in the doped $ZrO_2$, antimony trioxide, titanium dioxide and triphenyl phosphate and carrying out the esterification in a nitrogen atmosphere with a pressure of 0.3 MPa at 250° C., finally ending the reaction when the water distillation reaching 90% of the theoretical value, wherein the molar ration of terephthalic acid and ethylene glycol is 1:1.5, and being relative to the amount of terephthalic acid, the total addition of 2,5,6,6-tetramethyl-2,5-heptanediol and 2,2-difluoro-1,3-malonic acid (in a molar ratio of 1:1) is 6 mol %, whereas the addition of the doped $ZrO_2$, antimony trioxide, titanium dioxide and triphenyl phosphate are 0.25 wt %, 0.05 wt %, 2.0 wt % and 0.01 wt %, respectively;

(1.4) Polycondensation for the esterification products, smoothly reducing the pressure to 499 Pa (absolute value) within 30 min and carrying out reaction at 250° C. for 30 min, successively, further reducing the pressure to 99 Pa (absolute value) and continuing the reaction at 270° C. for 50 min, finally obtaining the modified polyester with a molecular weight of 25000 Da and a molecular weight distribution index of 1.8;

(2) Spinning of Degradable Polyester FDY through a FDY technological way including stages of metering, spinneret extruding (at 290° C.), cooling (at 20° C.), oiling, stretching as well as heat setting (carried on with the parameters of interlacing pressure 0.25 MPa, godet roller 1 speed 2500 m/min, godet roller 1 temperature 85° C., godet roller 2 speed 4000 m/min, godet roller 2 temperature 120° C.), and winding (4000 m/min), converting the modified polyester into fully dull polyester draw yarns.

Finally obtained degradable polyester fiber has the following performance indices of monofilament fineness 1.5 dtex, breaking strength 3.0 cN/dtex, elongation at break 28.0%, interlacing degree 11/m, linear density deviation rate 1.0%, breaking strength CV value 4.8%, elongation at break CV value 8.7%, boiling water shrinkage rate 7.0%, as well as an intrinsic viscosity drop of 28% after stored at 25° C. and R.H. 65% for 60 months.

Comparison 1

A method for preparing the degradable polyester fiber involved steps basically the same as those in Example 1, except for no addition of 2,5,6,6-tetramethyl-2,5-heptanediol, 2,2-difluoro-1,3-malonic acid and the doped $ZrO_2$ in step (1.3), from which the finally obtained polyester fiber has the following performance indices of monofilament fineness 1.5 dtex, breaking strength 3.1 cN/dtex, elongation at break 27%, interlacing degree 11/m, linear density deviation rate 1.0%, breaking strength CV value 5.0%, elongation at break CV value 8.7%, boiling water shrinkage rate 7.0%, as well as an intrinsic viscosity drop of 4% after stored at 25° C. and R.H. 65% for 60 months. From the results of Comparison 1 and Example 1, it can be concluded the modification could significantly improve the degradation performance of polyester without the loss in mechanical properties.

Comparison 2

A method for preparing the degradable polyester fiber involved steps basically the same as those in Example 1, except for adopting 3,3-difluoroglutaric acid instead of 2,2-difluoro-1,3-malonic acid in step (1), from which the finally obtained polyester fiber has an intrinsic viscosity drop of 14.8% after stored at 25° C. and R.H. 65% for 60 months. From the results of Comparison 1 and Example, it can be concluded that compared with α-C bonded fluorine atom, β-C bonded fluorine atom in the modified polyester can only make rather weak effect upon the natural degradation of the obtained polyester fiber, because its electron-withdrawing effect just pass to the neighbor atoms of β-C so as to give little influence on the nucleophilic addition reaction of ester carbonyl when attacked by $OH^-$, and the α-C bonded fluorine atom contained dicarboxylic acid is more effective in improving the natural degradation performance of polyester together with the doped $ZrO_2$ powder.

Example 2

A method for preparing the degradable polyester fiber, comprising the steps:

(1) Preparation of Modified Polyester (1.1) Synthesizing 2,5,6,6-tetramethyl-2,5-heptanediol (a) mixing KOH, 3-methyl-3-hydroxybutyne, 3,3-dimethyl-2-butanone and isopropyl ether in the molar ratio of 1.1:1:1.2:2.3, then carrying out the reaction in an ice bath for 2 hr, finally obtaining octynlydiol through a series of processes of cooling crystallization, centrifugation, washing, refining and drying;

(b) mixing octynyldiol, alcohol and Pd catalyst in the weight ratio of 2:10:0.01, then carrying out the reaction accompanied with a continuous hydrogen input at 45° C. for 50 min, finally obtaining 2,5,6,6-tetramethyl-2,5-heptanediol through a series of processes of separation and purification; wherein obtained target compound possessing a molecular structure just as shown in Formula (I);

(1.2) Doping Modification of $ZrO_2$ (a) evenly mixing the 1 wt % of $LiNO_3$ aqueous solution and the 20 wt % of $ZrO_2$ nitric acid solution in a molar ratio 5:100 of $Li^+$ and $Zr^{4+}$;

(b) depositing the mixed solution by dripping in 2 mol/L of ammonia water till pH=10, then washing and drying (at 105° C. for 3 hr) the precipitate;

(c) after the treatments including a heating at 400° C. for 2 hr, a heating at 700° C. for 1 hr and a cooling in air, finally grinding the precipitate to obtain the doped $ZrO_2$ powder with an average particle size of 0.4 micron;

(1.3) Esterification concocting terephthalic acid, ethylene glycol, 2,5,6,6-tetramethyl-2,5-heptanediol and 2,2-difluoro-1,4-succinic acid into a slurry, then adding in the doped $ZrO_2$, antimony glycol, titanium dioxide and trimethyl phosphate and carrying out the esterification in a nitrogen atmosphere with a pressure of normal value at 260° C., finally ending the reaction when the water distillation reaching 95% of the theoretical value, wherein the molar ration of terephthalic acid and ethylene glycol is 1:1.2, and being relative to the amount of terephthalic acid, the total addition of 2,5,6,6-tetramethyl-2,5-heptanediol and 2,2-difluoro-1,4-succinic acid (in a molar ratio of 2:2) is 4 mol %, whereas the addition of the doped $ZrO_2$, antimony trioxide, titanium dioxide and trimethyl phosphate are 0.23 wt %, 0.05 wt %, 2.2 wt % and 0.05 wt %, respectively;

(1.4) Polycondensation for the esterification products, smoothly reducing the pressure to 450 Pa (absolute value) within 50 min and carrying out reaction at 260° C. for 50 min, successively, further reducing the pressure to 90 Pa (absolute value) and continuing the reaction at 282° C. for 90 min, finally obtaining the modified polyester with a molecular weight of 30000 Da and a molecular weight distribution index of 2.2;

(2) Spinning of Degradable Polyester FDY through a FDY technological way including stages of metering, spinneret extruding (at 290° C.), cooling (at 20° C.), oiling, stretching as well as heat setting (carried on with the parameters of interlacing pressure 0.25 MPa, godet roller 1 speed 2500 m/min, godet roller 1 temperature 85° C., godet roller 2 speed 4000 m/min, godet roller 2 temperature 120° C.), and winding (4000 m/min), converting the modified polyester into fully dull polyester draw yarns.

Finally obtained degradable polyester fiber has the following performance indices of monofilament fineness 2.0 dtex, breaking strength 3.3 cN/dtex, elongation at break 36%, interlacing degree 15/m, linear density deviation rate 0.8%, breaking strength CV value 4.2%, elongation at break CV value 8.1%, boiling water shrinkage rate 6.0%, as well as an intrinsic viscosity drop of 23% after stored at 25° C. and R.H. 65% for 60 months.

Example 3

A method for preparing the degradable polyester fiber, comprising the steps:

(1) Preparation of Modified Polyester (1.1) Synthesizing
2,5,6,6-tetramethyl-2,5-heptanediol (a) mixing KOH, 3-methyl-3-hydroxybutyne, 3,3-dimethyl-2-butanone and isopropyl ether in the molar ratio of 1.2:1:1.25:2.0, then carrying out the reaction in an ice bath for 3 hr, finally obtaining octynlydiol through a series of processes of cooling crystallization, centrifugation, washing, refining and drying;

(b) mixing octynyldiol, alcohol and Pd catalyst in the weight ratio of 3:10:0.03, then carrying out the reaction accompanied with a continuous hydrogen input at 40° C. for 50 min, finally obtaining 2,5,6,6-tetramethyl-2,5-heptanediol through a series of processes of separation and purification; wherein obtained target compound possessing a molecular structure just as shown in Formula (I);

(1.2) Doping Modification of $ZrO_2$ (a) evenly mixing the 2 wt % of $Zn(NO_3)_2$ aqueous solution and the 25 wt % of $ZrO_2$ nitric acid solution in a molar ratio 8:100 of $Zn^{2+}$ and $Zr^{4+}$;

(b) depositing the mixed solution by dripping in 2 mol/L of ammonia water till pH=10, then washing and drying (at 110° C. for 2 hr) the precipitate;

(c) after the treatments including a heating at 400° C. for 3 hr, a heating at 700° C. for 2 hr and a cooling in air, finally grinding the precipitate to obtain the doped $ZrO_2$ powder with an average particle size of 0.4 micron;

(1.3) Esterification concocting terephthalic acid, ethylene glycol, 2,5,6,6-tetramethyl-2,5-heptanediol and 2,2-difluoro-1,5-glutaric acid into a slurry, then adding in the doped $ZrO_2$, antimony acetate, titanium dioxide and trimethyl phosphite and carrying out the esterification in a nitrogen atmosphere with a pressure of 0.2 MPa at 255° C., finally ending the reaction when the water distillation reaching 95% of the theoretical value, wherein the molar ration of terephthalic acid and ethylene glycol is 1:1.5, and being relative to the amount of terephthalic acid, the total addition of 2,5,6,6-tetramethyl-2,5-heptanediol and 2,2-difluoro-1,5-glutaric acid (in a molar ratio of 1:2) is 4.4 mol %, whereas the addition of the doped $ZrO_2$, antimony acetate, titanium dioxide and trimethyl phosphite are 0.23 wt %, 0.05 wt %, 2.3 wt % and 0.01 wt %, respectively;

(1.4) Polycondensation for the esterification products, smoothly reducing the pressure to 480 Pa (absolute value) within 40 min and carrying out reaction at 255° C. for 40 min, successively, further reducing the pressure to 95 Pa (absolute value) and continuing the reaction at 272° C. for 70 min, finally obtaining the modified polyester with a molecular weight of 27000 Da and a molecular weight distribution index of 2.0;

(2) Spinning of Degradable Polyester FDY through a FDY technological way including stages of metering, spinneret extruding (at 290° C.), cooling (at 20° C.), oiling, stretching as well as heat setting (carried on with the parameters of interlacing pressure 0.25 MPa, godet roller 1 speed 2500 m/min, godet roller 1 temperature 85° C., godet roller 2 speed 4000 m/min, godet roller 2 temperature 120° C.), and winding (4000 m/min), converting the modified polyester into fully dull polyester draw yarns.

Finally obtained degradable polyester fiber has the following performance indices of monofilament fineness 1.0 dtex, breaking strength 3.3 cN/dtex, elongation at break 35%, interlacing degree 14/m, linear density deviation rate 0.9%, breaking strength CV value 4.3%, elongation at break CV value 8.1%, boiling water shrinkage rate 6.2%, as well as an intrinsic viscosity drop of 24% after stored at 25° C. and R.H. 65% for 60 months.

Example 4

A method for preparing the degradable polyester fiber, comprising the steps:

(1) Preparation of Modified Polyester (1.1) Synthesizing 2,5,6,6-tetramethyl-2,5-heptanediol (a) mixing KOH, 3-methyl-3-hydroxybutyne, 3,3-dimethyl-2-butanone and isopropyl ether in the molar ratio of 1.2:1:1.3:2.5, then carrying out the reaction in an ice bath for 3 hr, finally obtaining octynlydiol through a series of processes of cooling crystallization, centrifugation, washing, refining and drying;

(b) mixing octynyldiol, alcohol and Pd catalyst in the weight ratio of 2.5:10:0.02, then carrying out the reaction accompanied with a continuous hydrogen input at 45° C. for 60 min, finally obtaining 2,5,6,6-tetramethyl-2,5-heptanediol through a series of processes of separation and purification; wherein obtained target compound possessing a molecular structure just as shown in Formula (I);

(1.2) Doping Modification of $ZrO_2$ (a) evenly mixing the 1.2 wt % of $Mg(NO_3)_2$ aqueous solution and the 22 wt % of $ZrO_2$ nitric acid solution in a molar ratio 6:100 of $Mg^{2+}$ and $Zr^{4+}$;

(b) depositing the mixed solution by dripping in 2 mol/L of ammonia water till pH=9, then washing and drying (at 106° C. for 2.5 hr) the precipitate;

(c) after the treatments including a heating at 400° C. for 2.5 hr, a heating at 700° C. for 1.5 hr and a cooling in air, finally grinding the precipitate to obtain the doped $ZrO_2$ powder with an average particle size of 0.4 micron;

(1.3) Esterification concocting terephthalic acid, ethylene glycol, 2,5,6,6-tetramethyl-2,5-heptanediol and 2,2-difluoro-1,5-glutaric acid into a slurry, then adding in the doped $ZrO_2$, antimony glycol, titanium dioxide and triphenyl phosphate and carrying out the esterification in a nitrogen atmosphere with a pressure of 0.25 MPa at 250° C., finally ending the reaction when the water distillation reaching 95% of the theoretical value, wherein the molar ration of terephthalic acid and ethylene glycol is 1:1.4, and being relative to the amount of terephthalic acid, the total addition of 2,5,6,6-tetramethyl-2,5-heptanediol and 2,2-difluoro-1,5-glutaric acid (in a molar ratio of 1.5:1) is 4.6 mol %, whereas the addition of the doped $ZrO_2$, antimony glycol, titanium dioxide and triphenyl phosphate are 0.24 wt %, 0.07 wt %, 3.0 wt % and 0.01 wt %, respectively;

(1.4) Polycondensation for the esterification products, smoothly reducing the pressure to 480 Pa (absolute value) within 35 min and carrying out reaction at 258° C. for 45 min, successively, further reducing the pressure to 96 Pa (absolute value) and continuing the reaction at 270° C. for 55 min, finally obtaining the modified polyester with a molecular weight of 26000 Da and a molecular weight distribution index of 1.9;

(2) Spinning of Degradable Polyester FDY through a FDY technological way including stages of metering, spinneret extruding (at 290° C.), cooling (at 20° C.), oiling, stretching as well as heat setting (carried on with the parameters of interlacing pressure 0.25 MPa, godet roller 1 speed 2500 m/min, godet roller 1 temperature 85° C., godet roller 2 speed 4000 m/min, godet roller 2 temperature 120° C.), and winding (4000 m/min), converting the modified polyester into fully dull polyester draw yarns.

Finally obtained degradable polyester fiber has the following performance indices of monofilament fineness 1.5 dtex, breaking strength 3.2 cN/dtex, elongation at break 34%, interlacing degree 14/m, linear density deviation rate 0.8%, breaking strength CV value 4.5%, elongation at break CV value 8.2%, boiling water shrinkage rate 6.3%, as well as an intrinsic viscosity drop of 25% after stored at 25° C. and R.H. 65% for 60 months.

Example 5

A method for preparing the degradable polyester fiber, comprising the steps:

(1) Preparation of Modified Polyester (1.1) Synthesizing 2,5,6,6-tetramethyl-2,5-heptanediol (a) mixing KOH, 3-methyl-3-hydroxybutyne, 3,3-dimethyl-2-butanone and isopropyl ether in the molar ratio of 1:1:1.3:3.0, then carrying out the reaction in an ice bath for 4 hr, finally obtaining octynlydiol through a series of processes of cooling crystallization, centrifugation, washing, refining and drying;

(b) mixing octynyldiol, alcohol and Pd catalyst in the weight ratio of 2.5:10:0.02, then carrying out the reaction accompanied with a continuous hydrogen input at 50° C. for 55 min, finally obtaining 2,5,6,6-tetramethyl-2,5-heptanediol through a series of processes of separation and purification; wherein obtained target compound possessing a molecular structure just as shown in Formula (I);

(1.2) Doping Modification of $ZrO_2$ (a) evenly mixing the 1.6 wt % of $LiNO_3$ aqueous solution and the 24 wt % of $ZrO_2$ nitric acid solution in a molar ratio 7:100 of $Li^+$ and $Zr^{4+}$;

(b) depositing the mixed solution by dripping in 2 mol/L of ammonia water till pH=9-10, then washing and drying (at 110° C. for 2 hr) the precipitate;

(c) after the treatments including a heating at 400° C. for 3 hr, a heating at 700° C. for 2 hr and a cooling in air, finally grinding the precipitate to obtain the doped $ZrO_2$ powder with an average particle size of 0.45 micron;

(1.3) Esterification concocting terephthalic acid, ethylene glycol, 2,5,6,6-tetramethyl-2,5-heptanediol and 2,2,3,3-tetrafluoro-1,4-succinic acid into a slurry, then adding in the doped $ZrO_2$, antimony acetate, titanium dioxide and triphenyl phosphate and carrying out the esterification in a nitrogen atmosphere with a pressure of 0.15 MPa at 260° C., finally ending the reaction when the water distillation reaching 95% of the theoretical value, wherein the molar ration of terephthalic acid and ethylene glycol is 1:1.5, and being relative to the amount of terephthalic acid, the total addition of 2,5,6,6-tetramethyl-2,5-heptanediol and 2,2,3,3-tetrafluoro-1,4-succinic acid (in a molar ratio of 1:1.5) is 4.9 mol %, whereas the addition of the doped $ZrO_2$, antimony acetate, titanium dioxide and triphenyl phosphate are 0.24 wt %, 0.05 wt %, 2.0 wt % and 0.01 wt %, respectively;

(1.4) Polycondensation for the esterification products, smoothly reducing the pressure to 480 Pa (absolute value) within 50 min and carrying out reaction at 255° C. for 50 min, successively, further reducing the pressure to 95 Pa (absolute value) and continuing the reaction at 282° C. for 80 min, finally obtaining the modified polyester with a molecular weight of 29000 Da and a molecular weight distribution index of 2.1;

(2) Spinning of Degradable Polyester FDY through a FDY technological way including stages of metering, spinneret extruding (at 295° C.), cooling (at 19° C.), oiling, stretching as well as heat setting (carried on with the parameters of interlacing pressure 0.20 MPa, godet roller 1 speed 2300 m/min, godet roller 1 temperature 80° C., godet roller 2 speed 3800 m/min, godet roller 2 temperature 115° C.), and winding (3730 m/min), converting the modified polyester into fully dull polyester draw yarns.

Finally obtained degradable polyester fiber has the following performance indices of monofilament fineness 1.5 dtex, breaking strength 3.2 cN/dtex, elongation at break 32%, interlacing degree 12/m, linear density deviation rate 0.9%, breaking strength CV value 4.6%, elongation at break CV value 8.5%, boiling water shrinkage rate 6.5%, as well as an intrinsic viscosity drop of 26% after stored at 25° C. and R.H. 65% for 60 months.

Example 6

A method for preparing the degradable polyester fiber, comprising the steps:

(1) Preparation of Modified Polyester (1.1) Synthesizing
2,5,6,6-tetramethyl-2,5-heptanediol (a) mixing KOH, 3-methyl-3-hydroxybutyne, 3,3-dimethyl-2-butanone and isopropyl ether in the molar ratio of 1.1:1:1.2:3.0, then carrying out the reaction in an ice bath for 4 hr, finally obtaining octynyldiol through a series of processes of cooling crystallization, centrifugation, washing, refining and drying;

(b) mixing octynyldiol, alcohol and Pd catalyst in the weight ratio of 3:10:0.03, then carrying out the reaction accompanied with a continuous hydrogen input at 50° C. for 60 smin, finally obtaining 2,5,6,6-tetramethyl-2,5-heptanediol through a series of processes of separation and purification; wherein obtained target compound possessing a molecular structure just as shown in Formula (I);

(1.2) Doping Modification of $ZrO_2$ (a) evenly mixing the 2 wt % of $Mg(NO_3)_2$ and $Zn(NO_3)_2$ aqueous solution in a weight ratio of 1:1 to obtain a mixture solution of metal ion $M^{x+}$, and then blending the mixture with the 20 wt % of $ZrO_2$ nitric acid solution in a molar ratio 8:100 of $M^{x+}$ and $Zr^{4+}$;

(b) depositing the mixed solution by dripping in 2 mol/L of ammonia water till pH=10, then washing and drying (at 110° C. for 2 hr) the precipitate;

(c) after the treatments including a heating at 400° C. for 2 hr, a heating at 700° C. for 1 hr and a cooling in air, finally grinding the precipitate to obtain the doped $ZrO_2$ powder with an average particle size of 0.4 micron;

(1.3) Esterification concocting terephthalic acid, ethylene glycol, 2,5,6,6-tetramethyl-2,5-heptanediol and 2,2,3,3-tetrafluoro-1,4-succinic acid into a slurry, then adding in the doped $ZrO_2$, antimony acetate, titanium dioxide and triphenyl phosphate and carrying out the esterification in a nitrogen atmosphere with a pressure of 0.3 MPa at 250° C., finally ending the reaction when the water distillation reaching 95% of the theoretical value, wherein the molar ration of terephthalic acid and ethylene glycol is 1:1.6, and being relative to the amount of terephthalic acid, the total addition of 2,5,6,6-tetramethyl-2,5-heptanediol and 2,2,3,3-tetrafluoro-1,4-succinic acid (in a molar ratio of 1.2:1) is 5.2 mol %, whereas the addition of the doped $ZrO_2$, antimony acetate, titanium dioxide and triphenyl phosphate are 0.25 wt %, 0.05 wt %, 2.8 wt % and 0.01 wt %, respectively;

(1.4) Polycondensation for the esterification products, smoothly reducing the pressure to 450 Pa (absolute value) within 30 min and carrying out reaction at 260° C. for 30 min, successively, further reducing the pressure to 92 Pa (absolute value) and continuing the reaction at 272° C. for 85 min, finally obtaining the modified polyester with a molecular weight of 28000 Da and a molecular weight distribution index of 1.8;

(2) Spinning of Degradable Polyester FDY through a FDY technological way including stages of metering, spinneret extruding (at 295° C.), cooling (at 19° C.), oiling, stretching as well as heat setting (carried on with the parameters of interlacing pressure 0.20 MPa, godet roller 1 speed 2300 m/min, godet roller 1 temperature 80° C., godet roller 2 speed 3800 m/min, godet roller 2 temperature 115° C.), and winding (3730 m/min), converting the modified polyester into fully dull polyester draw yarns.

Finally obtained degradable polyester fiber has the following performance indices of monofilament fineness 1.5 dtex, breaking strength 3.2 cN/dtex, elongation at break 30%, interlacing degree 11/m, linear density deviation rate 1.0%, breaking strength CV value 4.8%, elongation at break CV value 8.6%, boiling water shrinkage rate 6.7%, as well as an intrinsic viscosity drop of 26% after stored at 25° C. and R.H. 65% for 60 months.

Example 7

A method for preparing the degradable polyester fiber, comprising the steps:

(1) Preparation of Modified Polyester (1.1) Synthesizing
2,5,6,6-tetramethyl-2,5-heptanediol (a) mixing KOH, 3-methyl-3-hydroxybutyne, 3,3-dimethyl-2-butanone and isopropyl ether in the molar ratio of 1.2:1:1.2:3.0, then carrying out the reaction in an ice bath for 3 hr, finally obtaining octynyldiol through a series of processes of cooling crystallization, centrifugation, washing, refining and drying;

(b) mixing octynyldiol, alcohol and Pd catalyst in the weight ratio of 3:10:0.02, then carrying out the reaction accompanied with a continuous hydrogen input at 42° C. for 55 min, finally obtaining 2,5,6,6-tetramethyl-2,5-heptanediol through a series of processes of separation and purification; wherein obtained target compound possessing a molecular structure just as shown in Formula (I);

(1.2) Doping Modification of $ZrO_2$ (a) evenly mixing the 1 wt % of $Mg(NO_3)_2$ and $LiNO_3$ aqueous solution in a weight ratio of 1:1 to obtain a mixture solution of metal ion $M^{x+}$, and then blending the mixture with the 24 wt % of $ZrO_2$ nitric acid solution in a molar ratio 6:100 of $M^{x+}$ and $Zr^{4+}$;

(b) depositing the mixed solution by dripping in 2 mol/L of ammonia water till pH=10, then washing and drying (at 110° C. for 3 hr) the precipitate;

(c) after the treatments including a heating at 400° C. for 2 hr, a heating at 700° C. for 2 hr and a cooling in air, finally grinding the precipitate to obtain the doped $ZrO_2$ powder with an average particle size of 0.45 micron;

(1.3) Esterification concocting terephthalic acid, ethylene glycol, 2,5,6,6-tetramethyl-2,5-heptanediol and 2,2-difluoro-1,3-malonic acid into a slurry, then adding in the doped $ZrO_2$, antimony trioxide, titanium dioxide and trimethyl phosphite and carrying out the esterification in a nitrogen atmosphere with a pressure of 0.2 MPa at 255° C., finally ending the reaction when the water distillation reaching 95% of the theoretical value, wherein the molar ration of terephthalic acid and ethylene glycol is 1:1.6, and being relative to the amount of terephthalic acid, the total addition of 2,5,6,6-tetramethyl-2,5-heptanediol and 2,2-difluoro-1,3-malonic acid (in a molar ratio of 2:1.5) is 5.4 mol %, whereas the addition of the doped $ZrO_2$, antimony trioxide, titanium dioxide and trimethyl phosphite are 0.25 wt %, 0.04 wt %, 3.0 wt % and 0.05 wt %, respectively;

(1.4) Polycondensation for the esterification products, smoothly reducing the pressure to 490 Pa (absolute value) within 50 min and carrying out reaction at 255° C. for 50 min, successively, further reducing the pressure to 95 Pa (absolute value) and continuing the reaction at 275° C. for 55 min, finally obtaining the modified polyester with a molecular weight of 25000 Da and a molecular weight distribution index of 2.2;

(2) Spinning of Degradable Polyester FDY through a FDY technological way including stages of metering, spinneret extruding (at 285° C.), cooling (at 22° C.), oiling, stretching as well as heat setting (carried on with the parameters of interlacing pressure 0.30 MPa, godet roller 1 speed 2700 m/min, godet roller 1 temperature 90° C., godet roller 2 speed 4200 m/min, godet roller 2 temperature 130° C., and winding (4120 m/min), converting the modified polyester into fully dull polyester draw yarns.

Finally obtained degradable polyester fiber has the following performance indices of monofilament fineness 1.0 dtex, breaking strength 3.1 cN/dtex, elongation at break 30%, interlacing degree 15/m, linear density deviation rate 1.0%, breaking strength CV value 4.7%, elongation at break CV value 8.8%, boiling water shrinkage rate 6.8%, as well as an intrinsic viscosity drop of 27% after stored at 25° C. and R.H. 65% for 60 months.

Example 8

A method for preparing the degradable polyester fiber, comprising the steps:

(1) Preparation of Modified Polyester (1.1) Synthesizing 2,5,6,6-tetramethyl-2,5-heptanediol (a) mixing KOH, 3-methyl-3-hydroxybutyne, 3,3-dimethyl-2-butanone and isopropyl ether in the molar ratio of 1.2:1:1.2:3.0, then carrying out the reaction in an ice bath for 3 hr, finally obtaining octynylydiol through a series of processes of cooling crystallization, centrifugation, washing, refining and drying;

(b) mixing octynyldiol, alcohol and Pd catalyst in the weight ratio of 3:10:0.02, then carrying out the reaction accompanied with a continuous hydrogen input at 42° C. for 55 min, finally obtaining 2,5,6,6-tetramethyl-2,5-heptanediol through a series of processes of separation and purification; wherein obtained target compound possessing a molecular structure just as shown in Formula (I);

(1.2) Doping Modification of $ZrO_2$ (a) evenly mixing the 1 wt % of $Mg(NO_3)_2$ and $LiNO_3$ aqueous solution in a weight ratio of 1:1 to obtain a mixture solution of metal ion $M^{x+}$, and then blending the mixture with the 24 wt % of $ZrO_2$ nitric acid solution in a molar ratio 6:100 of $M^{x+}$ and $Zr^{4+}$;

(b) depositing the mixed solution by dripping in 2 mol/L of ammonia water till pH=10, then washing and drying (at 110° C. for 3 hr) the precipitate;

(c) after the treatments including a heating at 400° C. for 2 hr, a heating at 700° C. for 2 hr and a cooling in air, finally grinding the precipitate to obtain the doped $ZrO_2$ powder with an average particle size of 0.45 micron;

(1.3) Esterification concocting terephthalic acid, ethylene glycol, 2,5,6,6-tetramethyl-2,5-heptanediol and 2,2-difluoro-1,3-malonic acid into a slurry, then adding in the doped $ZrO_2$, antimony glycol, titanium dioxide and triphenyl phosphate and carrying out the esterification in a nitrogen atmosphere with a pressure of 0.3 MPa at 255° C., finally ending the reaction when the water distillation reaching 95% of the theoretical value, wherein the molar ration of terephthalic acid and ethylene glycol is 1:2.0, and being relative to the amount of terephthalic acid, the total addition of 2,5,6,6-tetramethyl-2,5-heptanediol and 2,2-difluoro-1,3-malonic acid (in a molar ratio of 2:1) is 5.8 mol %, whereas the addition of the doped $ZrO_2$, antimony glycol, titanium dioxide and triphenyl phosphate are 0.25 wt %, 0.04 wt %, 2.0 wt % and 0.03 wt %, respectively;

(1.4) Polycondensation for the esterification products, smoothly reducing the pressure to 480 Pa (absolute value) within 50 min and carrying out reaction at 260° C. for 40 min, successively, further reducing the pressure to 95 Pa (absolute value) and continuing the reaction at 272° C. for 90 min, finally obtaining the modified polyester with a molecular weight of 29000 Da and a molecular weight distribution index of 2.1;

(2) Spinning of Degradable Polyester FDY through a FDY technological way including stages of metering, spinneret extruding (at 285° C.), cooling (at 22° C.), oiling, stretching as well as heat setting (carried on with the parameters of interlacing pressure 0.30 MPa, godet roller 1 speed 2700 m/min, godet roller 1 temperature 90° C., godet roller 2 speed 4200 m/min, godet roller 2 temperature 130° C.), and winding (4120 m/min), converting the modified polyester into fully dull polyester draw yarns.

Finally obtained degradable polyester fiber has the following performance indices of monofilament fineness 1.0 dtex, breaking strength 3.0 cN/dtex, elongation at break 29%, interlacing degree 11/m, linear density deviation rate 1.0%, breaking strength CV value 5.0%, elongation at break CV value 8.8%, boiling water shrinkage rate 7.0%, as well as an intrinsic viscosity drop of 28% after stored at 25° C. and R.H. 65% for 60 months.

What is claimed is:

1. A preparing method for a degradable polyester fiber, comprising:

manufacturing a fully drawn yarn (FDY) with a modified polyester;

wherein the modified polyester is a product of an esterification and a successive polycondensation of evenly mixed terephthalic acid, ethylene glycol, 2,5,6,6-tetramethyl-2,5-heptanediol, a doped $ZrO_2$ powder and a fluorinated dicarboxylic acid;

wherein the 2,5,6,6-tetramethyl-2,5-heptanediol has a molecular formula of

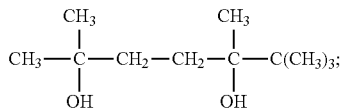

wherein the fluorinated dicarboxylic acid is selected from the group consisting of 2,2-difluoro-1,3-malonic acid, 2,2-difluoro-1,4-succinic acid, 2,2-difluoro-1,5-glutaric acid and 2,2,3,3-tetrafluoro-1,4-succinic acid;

wherein the doped $ZrO_2$ powder is obtained through a process of evenly mixing a $M^{x+}$ solution and a $Zr^{4+}$ solution at first, then dripping in a precipitant until a pH value is 9-10, and finally calcining the precipitate; wherein $M^{x+}$ is more than one ion selected from the group consisting of $Mg^{2+}$, $Li^+$ and $Zn^{2+}$;

wherein a solution blending before a coprecipitation is to make a mixture containing (5-8):100 (molar ratio) of $M^{x+}$ respecting to $Zr^{4+}$;

wherein an addition of the doped $ZrO_2$ powder is 0.23-0.25 wt %, being relative to an amount of the terephthalic acid.

2. The preparing method of claim 1, wherein the 2,5,6,6-tetramethyl-2,5-heptanediol is synthesized by the steps of:

(1) mixing KOH, 3-methyl-3-hydroxybutyne, 3,3-dimethyl-2-butanone and isopropyl ether in a molar ratio of (1-1.2):1:(1.2-1.3):(2.0-3.0), then carrying out a first reaction in an ice bath for 2-4 hr, finally obtaining heptynediol through a series of processes of cooling crystallization, centrifugation, washing, refining and drying;

(2) mixing the heptynediol, an alcohol and a Pd catalyst in a weight ratio of (2-3):10:(0.01-0.03), then carrying out a second reaction accompanied with a continuous hydrogen input at 40-50° C. for 50-60 min, finally obtaining the 2,5,6,6-tetramethyl-2,5-heptanediol through a series of processes of separation and purification.

3. The preparing method of claim 2, wherein the $M^{x+}$ solution is an aqueous solution with a concentration of 1-2 wt % and an anion is $NO_3^-$; wherein the $Zr^{4+}$ solution is a product of dissolving 20-25 wt % of $ZrO_2$ in nitric acid; wherein the precipitant is ammonia water with a concentration of 2 mol/L;

wherein the calcining is preceded by a washing process and a drying process for the precipitate, and the drying process is carried out at a temperature of 105-110° C. for 2-3 hr; wherein the calcining includes steps of a 400° C. heating for 2-3_hr, a 700° C. heating for 1-2 hr, a cooling in air and a grinding to obtain particles with an average size of less than 0.5 μm.

4. The preparing method of claim 3, wherein the modified polyester is manufactured through the following steps:

(1) the esterification concocting the terephthalic acid, the ethylene glycol, the 2,5,6,6-tetramethyl-2,5-heptanediol and the fluorinated dicarboxylic acid into a slurry, then adding in the doped $ZrO_2$ powder, a catalyst, a matting agent and a stabilizer and carrying out the esterification in a nitrogen atmosphere with a pressure of normal value-0.3 MPa at 250-260° C., finally ending the esterification when a water distillation reaches more than 90% of a theoretical value;

(2) polycondensation for products of the esterification, reducing the pressure to less than 500 Pa (absolute value) within 30-50 min and carrying out the polycondensation at 250-260° C. for 30-50 min, successively, further reducing the pressure to less than 100 Pa (absolute value) and continuing the polycondensation at 270-282° C. for 50-90 min.

5. The preparing method of claim 4, wherein a molar ratio of the terephthalic acid and the ethylene glycol is 1:(1.2-2.0), and being relative to the amount of the terephthalic acid, a total addition of the 2,5,6,6-tetramethyl-2,5-heptanediol and the fluorinated dicarboxylic acid (in a molar ratio of (1-2):(1-2)) is 4-6 mol %, whereas an addition of the catalyst, the matting agent and the stabilizer are 0.03-0.05 wt %, 0.2-0.25 wt % and 0.01-0.05 wt %, respectively.

6. The preparing method of claim 5, wherein the catalyst is selected from the group consisting of antimony trioxide, ethylene glycol antimony and antimony acetate, wherein the matting agent is titanium dioxide, and wherein the stabilizer is selected from the group consisting of triphenyl phosphate, trimethyl phosphate and trimethyl phosphite.

7. The preparing method claim 6, wherein the modified polyester has a molecular weight of 25000-30000 and a molecular weight distribution index of 1.8-2.2.

8. The preparing method of claim 1, wherein a FDY process to manufacture the FDY comprises steps of metering, spinneret extruding, cooling, oiling, stretching, heat setting and winding;

wherein the FDY process involves technological parameters: a spinning temperature of 285-295° C., a cooling temperature of 19-22° C., an interlacing pressure of 0.20-0.30 MPa, a godet roller 1 speed of 2300-2700 m/min, a godet roller 1 temperature of 80-90° C., a godet roller 2 speed of 3800-4200 m/min, a godet roller 2 temperature of 115-130° C., and a winding speed of 3730-4120 m/min.

9. A degradable polyester fiber prepared by the preparing method of claim 1, comprising: a modified polyester FDY; wherein the modified polyester has a molecular chain structure composed of terephthalic acid segments, ethylene glycol segments, 2,5,6,6-tetramethyl-2,5-heptanediol segments and fluorinated dicarboxylic acid segments; wherein the modified polyester is also dispersed with the doped $ZrO_2$ powder obtained through the process of evenly mixing the $M^{x+}$ solution and the $Zr^{4+}$ solution at first, then dripping in the precipitant until the pH value is 9-10, and finally calcining the precipitate; wherein the $M^{x+}$ is more than one ion selected from the group consisting of $Mg^{2+}$, $Li^+$ and $Zn^{2+}$.

10. The degradable polyester fiber of claim 9, wherein the degradable polyester fiber comprises mechanical performance indices: a monofilament fineness of 1.0-2.0 dtex, a breaking strength ≥3.0 cN/dtex, an elongation at break of 32.0±4.0%, an interlacing degree of 13±2/m, a linear density deviation rate ≤1.0%, a breaking strength CV value ≤5.0%, a breaking elongation CV value ≤9.0%, a boiling water shrinkage rate of 6.5±0.5%, an intrinsic viscosity drop of 23-28% after a storage at 25° C. and a R.H. 65% for 60 months.

11. The degradable polyester fiber of claim 9, wherein the 2,5,6,6-tetramethyl-2,5-heptanediol is synthesized by the steps of:
 (1) mixing KOH, 3-methyl-3-hydroxybutyne, 3,3-dimethyl-2-butanone and isopropyl ether in a molar ratio of (1-1.2):1:(1.2-1.3):(2.0-3.0), then carrying out a first reaction in an ice bath for 2-4 hr, finally obtaining heptynediol through a series of processes of cooling crystallization, centrifugation, washing, refining and drying;
 (2) mixing the heptynediol, an alcohol and a Pd catalyst in a weight ratio of (2-3):10:(0.01-0.03), then carrying out a second reaction accompanied with a continuous hydrogen input at 40-50° C. for 50-60 min, finally obtaining the 2,5,6,6-tetramethyl-2,5-heptanediol through a series of processes of separation and purification.

12. The degradable polyester fiber of claim 11, wherein the $M^{x+}$ solution is an aqueous solution with a concentration of 1-2 wt % and an anion is $NO_3^-$; wherein the $Zr^{4+}$ solution is a product of dissolving 20-25 wt % of $ZrO_2$ in nitric acid; wherein the precipitant is ammonia water with a concentration of 2 mol/L;
 wherein the calcining is preceded by a washing process and a drying process for the precipitate, and the drying process is carried out at a temperature of 105-110° C. for 2-3 hr; wherein the calcining includes steps of a 400° C. heating for 2-3 hr, a 700° C. heating for 1-2 hr, a cooling in air and a grinding to obtain particles with an average size of less than 0.5 μm.

13. The degradable polyester fiber of claim 12, wherein the modified polyester is manufactured through the following steps:
 (1) the esterification
 concocting the terephthalic acid, the ethylene glycol, the 2,5,6,6-tetramethyl-2,5-heptanediol and the fluorinated dicarboxylic acid into a slurry, then adding in the doped $ZrO_2$ powder, a catalyst, a matting agent and a stabilizer and carrying out the esterification in a nitrogen atmosphere with a pressure of normal value-0.3 MPa at 250-260° C., finally ending the esterification when a water distillation reaches more than 90% of a theoretical value;
 (2) polycondensation for products of the esterification, reducing the pressure to less than 500 Pa (absolute value) within 30-50 min and carrying out the polycondensation at 250-260 ° C. for 30-50 min, successively, further reducing the pressure to less than an absolute value of 100 Pa (absolute value) and continuing the polycondensation at 270-282 ° C. for 50-90 min.

14. The degradable polyester fiber of claim 13, wherein a molar ratio of the terephthalic acid and the ethylene glycol is 1:(1.2-2.0), and being relative to the amount of the terephthalic acid, a total addition of the 2,5,6,6-tetramethyl-2,5-heptanediol and the fluorinated dicarboxylic acid (in a molar ratio of (1-2):(1-2)) is 4-6 mol %, whereas an addition of the catalyst, the matting agent and the stabilizer are 0.03-0.05 wt %, 0.2-0.25 wt % and 0.01-0.05 wt %, respectively.

15. The degradable polyester fiber of claim 14, wherein the catalyst is selected from the group consisting of antimony trioxide, ethylene glycol antimony and antimony acetate, wherein the matting agent is titanium dioxide, and wherein the stabilizer is selected from the group consisting of triphenyl phosphate, trimethyl phosphate and trimethyl phosphite.

16. The degradable polyester fiber of claim 15, wherein the modified polyester has a molecular weight of 25000-30000 and a molecular weight distribution index of 1.8-2.2.

17. The degradable polyester fiber of claim 9, wherein a FDY process to manufacture the FDY comprises steps of metering, spinneret extruding, cooling, oiling, stretching, heat setting and winding;
 wherein the FDY process involves technological parameters: a spinning temperature of 285-295° C., a cooling temperature of 19-22° C., an interlacing pressure of 0.20-0.30 MPa, a godet roller 1 speed of 2300-2700 m/min, a godet roller 1 temperature of 80-90° C., a godet roller 2 speed of 3800-4200 m/min, a godet roller 2 temperature of 115-130° C., and a winding speed of 3730-4120 m/min.

* * * * *